Oct. 27, 1936.   F. A. GREEN   2,059,100
TIRE CHAIN
Filed June 9, 1936
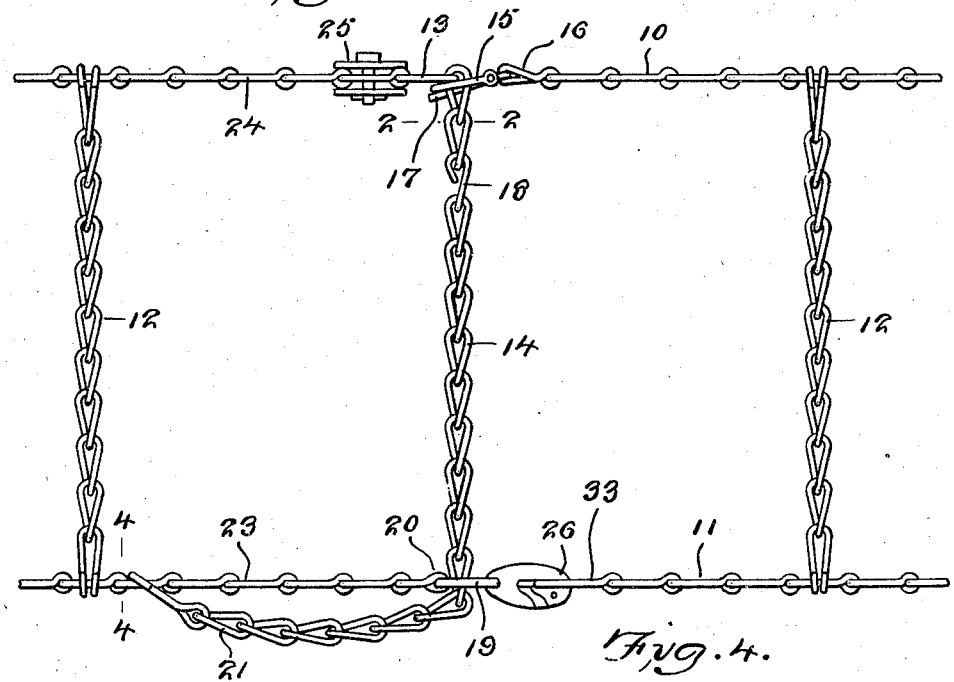
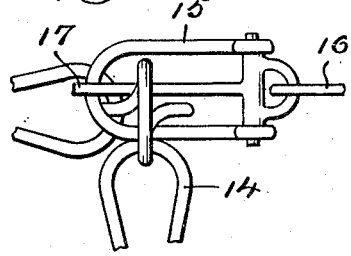
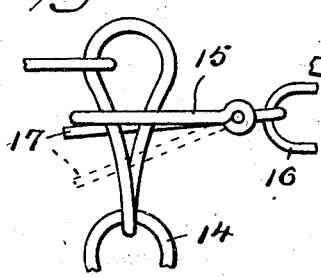
Fulton A. Green INVENTOR
BY Victor J. Evans & Co.
ATTORNEY Patented Oct. 27, 1936

2,059,100

UNITED STATES PATENT OFFICE 2,059,100

TIRE CHAIN

Fulton A. Green, Ford City, Pa.

Application June 9, 1936, Serial No. 84,371

3 Claims. (Cl. 152—14)

The invention relates to a tire chain and more especially to non-skid chains for motor vehicle wheels.

The primary object of the invention is the provision of a chain of this character, wherein the same can be conveniently fastened upon the tire of a vehicle wheel without necessitating a user from first fastening the chain at the inner side of such wheel as the said chain can be conveniently fastened in place at the outside of the wheel thus rendering the task of applying and removing the chain an easy one.

Another object of the invention is the provision of a chain of this character, wherein an extension is provided and should this extension become worn and unfit for use it can be readily and conveniently replaced, the chain in its entirety being of novel construction facilitating the placing of the chain upon a tire of a vehicle wheel and its removal.

A further object of the invention is the provision of a chain of this character, wherein by the construction thereof it can be properly adjusted to fit the tire of a vehicle wheel and when in place thereon will not become loose or accidentally detached.

A still further object of the invention is the provision of a chain of this character, which is simple in construction, thoroughly reliable and effective in its operation, convenient for handling, susceptible of being fastened upon the tire of a vehicle wheel at the outside of the latter and with dispatch, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a fragmentary plan view of a tire chain constructed in accordance with the invention.

Figure 2 is a sectional view on the line 2—2 of Figure 1 looking in the direction of the arrows.

Figure 3 is a plan view of that portion of the chain shown in Figure 2.

Figure 4 is a sectional view on the line 4—4 of Figure 1.

Figure 5 is an enlarged side elevation of one of the fasteners employed with the chain and in open position.

Figure 6 is a view similar to Figure 5 showing the fastener closed.

Similar reference characters indicate corresponding parts throughout the several views in the drawing.

Referring to the drawing in detail, the tire chain comprises a pair of side lengths of chains 10 and 11, respectively, these at intervals between their ends having connected therewith cross lengths of chains 12, these lengths, both side and cross lengths, being of the link type of chain. The length of chain 10 which is adapted to be located at the inner side of the tired vehicle wheel has at one end 13 thereof an extension length of chain 14 which is adapted to be trained through a loop-like buckle 15 connected with the other end 16 of said length of chain 10. This buckle 15 carries a pivot tongue or prong 17 which engages in a link 18 of the extension length of chain 14. This length 14 is also brought outwardly across the tire of the vehicle and is trained through a coupling ring or loop 19 which connects the end 20 of the side length of chain 11 with a fastener hereinafter fully described.

The tongue or prong 17 of the buckle 15 engaging selectively with a link 18 of the extension of chain 14 latches the said extension of chain at the point of connecting the ends 13 and 16 of the inside length of chain 10 together. This extension length of chain 14 at the end 21 carries a snap hook 22 for fastening selectively with any one of the links 23 of the side length of chain 11 as is clearly shown in Figure 1 of the drawing and in this manner the tire chain can be conveniently applied to the tire of the wheel and such chain fastened in its applied manner at the outer side of said wheel.

Carried by the side length of chain 10 in a link 24 thereof next to the extension length of chain 14 is an adjustable stop button 25 which limits the threading of the said length of chain 14 through the buckle 15 when such length of chain 14 is being pulled through the said buckle for the tightening of the said length of chain 10 at the inner side of the wheel.

The fastener for connecting together the ends of the outermost side length of chain 11 comprises a body member 26 of substantially oval formation and elongated, this having a jaw end 27 created by a receiving slot 28 provided in said body 26 while pivoted to this jaw end is a latching jaw 29 formed with a lever 30, the jaw 29 being provided with a notch 31 and a cam acting hook 32, respectively, so that the other end 33 of the side length of chain 11 can be engaged in the notch 31 of the jaw 29 when the latter is open with respect to the jaw 27 of the body 26 and on the turning of the lever 30 the said notch 31 will deliver this end 33 into the slot 28 in the body 26 whence the hook 32 under cam action will latch the end 33 of the side length of chain 11 in the keeper portions 34 and 35 of both jaws 27 and 29, respectively, of said fastener when these jaws are in closed relation to each other, the open position of the fastener being shown in Figure 5 and the closed position in Figure 6 of the drawing. Thus it will be seen from Figure 1 of the drawing that the tire chain can be readily and conveniently applied to the tire of a wheel and such chain fastened at the outside of the wheel in its applied condition, thereby avoiding the necessity of a user of the chain getting rearwardly of the wheel for the fastening of the inside length of chain 10 at the inner side of the wheel as the extension length of chain 14 permits the fastening of the chain in its entirety at the outer side of the wheel as has been hereinbefore set forth.

What is claimed is:

1. A tire chain of the character described comprising a pair of spaced side lengths of chains, a prong to buckle at one end of one side length of chain, an extension length of chain connected with the other end of said side length of chain having the buckle and trained through the latter, a fastener for connecting the ends of the other side length of chain together and having a coupling member through which is trained the said extension length of chain, and a snap fastener at the outermost free end of said extension length of chain and selectively engageable with links of the said other side length of chain.

2. A tire chain of the character described comprising a pair of spaced side lengths of chains, a prong to buckle at one end of one side length of chain, an extension length of chain connected with the other end of said side length of chain having the buckle and trained through the latter, a fastener for connecting the ends of the other side length of chain together and having a coupling member through which is trained the said extension length of chain, a snap fastener at the outermost free end of said extension length of chain and selectively engageable with links of the said other side length of chain, and cross lengths of chains connected with the side lengths of chains at determined intervals throughout the same.

3. A tire chain of the character described comprising a pair of spaced side lengths of chains, a prong to buckle at one end of one side length of chain, an extension length of chain connected with the other end of said side length of chain having the buckle and trained through the latter, a fastener for connecting the ends of the other side length of chain together and having a coupling member through which is trained the said extension length of chain, a snap fastener at the outermost free end of said extension length of chain and selectively engageable with links of the said other side length of chain, cross lengths of chains connected with the side lengths of chains at determined intervals throughout the same, and an adjustable stop button carried by the side length of chain having the extension length of chain and located close to the latter.

FULTON A. GREEN.